Nov. 11, 1924.

H. W. EARP-THOMAS 1,515,016

CULTURE OF BENEFICIAL SOIL BACTERIA AND METHOD OF PRODUCING SAME

Filed Nov. 25, 1921

INVENTOR.
Henry W. Earp-Thomas
BY Arthur L. Kent
his ATTORNEY.

Patented Nov. 11, 1924.

1,515,016

UNITED STATES PATENT OFFICE.

HENRY W. EARP-THOMAS, OF NEW YORK, N. Y.

CULTURE OF BENEFICIAL SOIL BACTERIA AND METHOD OF PRODUCING SAME.

Application filed November 25, 1921. Serial No. 517,524.

*To all whom it may concern:*

Be it known that I, HENRY W. EARP-THOMAS, a British subject, residing at New York city, in the county of New York and State of New York, have invented certain new and useful Improvements in Culture of Beneficial Soil Bacteria and Methods of Producing Same, fully described and represented in the following specification and the accompanying drawings forming a part of the same.

This invention relates to the preparation and distribution of virile copious cultures of beneficial soil bacteria suitable for use in inoculating seeds, growing crops and soil, and for inoculating fertilizing materials and mixtures of various kinds. In the production and distribution of artificial or laboratory-produced cultures of beneficial soil bacteria according to the methods heretofore employed, extreme care has been necessary in order to avoid contamination of the cultures with undesired bacteria and other harmful micro-organisms, and methods followed in order to avoid such contamination have largely added to the cost of producing and distributing the cultures.

The object of the present invention is to provide improved copious, or high count, cultures of virile bacteria of the kinds desired and an improved process of preparing and distributing the same, at a cost much lower than the cost of preparing and distributing cultures of beneficial soil bacteria according to the methods heretofore employed for the production and distribution of cultures at all comparable to those of the present invention.

I have discovered that a culture medium consisting of glauconite, most desirably in the form of greensand marl, combined in suitable proportionate amounts with suitable nutrient materials is very favorable to the growth of various kinds and varieties of beneficial soil bacteria while being at the same time distinctly unfavorable to the growth of harmful bacteria and other harmful micro-organisms, provided the material has a neutral, or better, slightly alkaline reaction and the moisture content is kept low. Glauconite contains a high percentage of potassium which apparently is not in a very fixed form but is readily acted on by the by-products of various soil bacteria. It also contains a smaller percentage of lime.

Greensand marl as found in the eastern United States, and especially in large deposits in New Jersey, is principally glauconite mixed with some sand containing a small amount of organic matter. This earthy material, which I have found to be distinctly unfavorable to the growth of all kinds of micro-organisms which are antagonistic to the beneficial soil bacteria or which for other reasons it is undesirable to have present in garden or farm soil, is, on the other hand, a particularly good growing medium and carrier for various beneficial soil bacteria such as the nitrifying and nitrogen fixing bacteria, including the symbiotic or legume nitrogen fixing bacteria.

Taking advantage of the above characteristics or properties of glauconite, and especially greensand marl, I have by combining with greensand marl a suitable amount of carbonaceous and other materials and by maintaining a suitable moisture content, and by inoculating the material with various beneficial soil bacteria either in a pure culture of a single kind or species or in mixed or composite cultures of various kinds of such bacteria, succeeded in producing in a comparatively simple and inexpensive way strong, virile and extremely high-count cultures. I find it desirable to add to the greensand marl, or glauconte in other form, such substances as sucrose, malt or maltose, mannite, and sulphur, and hard wood ashes or phosphate, iron, lime, magnesia and manganese; also phosphate bearing material such as raw bone meal, fine ground basic slag, or fine ground phosphate rock or apatite. These phosphate materials not only encourage the growth of certain of the beneficial bacteria, especially the sulphur and nitrifying types, but they also act to take up excess acids formed by the bacteria. Other elements suitable for producing a favorable reaction of the medium for the development of the desired bacteria may be added. It is also desirable to add a relatively large proportionate amount of peat humus or other suitable humus material. The addition of humus is especially desirable in the production of cultures for distribution or which are to be kept for any long period of time, because of the moisture-retaining property of the humus. In such a medium the greensand marl and humus will form the principal constituent materials, These materials may be used in about equal proportionate amounts, although good results may be obtained with quite widely varying relative amounts of these two materials. The other materials are added to the mixture in relatively small proportionate amounts, except that when phosphate bearing material is used in the medium an amount equal to about one-third of the amount of glauconite or humus may be used. Other food materials such as molasses, blood, fish scrap, fish glue, tankage and alfalfa meal may be added for the purpose of hastening the growth of the bacteria, but the addition of such substances have the disadvantage of making the medium less unfavorable to the growth of harmful organisms.

The glauconite or greensand marl and the humus, as well as other materials entering into the mixture, should be in finely divided condition, and the humus should be well dried and should be free from weed seeds, mold and harmful bacteria. It is desirable that the humus be sterilized by steam at a temperature of not less than 212° F., or dry heat before being added to the mixture, and if acid in reaction this should be corrected by the addition of alkaline or antacid substances such as calcium carbonate, carbonates of potassium, sodium, magnesium, etc. The greensand marl should also most desirably be sterilized by heat to destroy any microorganisms it may contain, or the greensand marl and humus mixed together, or better, the complete medium mixture, may be sterilized in any suitable manner. Because of its unfavorableness to growth of harmful organisms, sterilization of the medium or its entire freedom from the harmful organisms is not of the same great importance as in the case of the usual jelly or liquid media; but since the medium is not so antagonistic to all harmful micro-organisms as absolutely to prevent their growth, but rather acts to cause the growth of such organisms to be slight as compared to the growth of the beneficial soil bacteria with which the medium is inoculated, it is best to start with the medium free from all harmful organisms, thereby giving a better opportunity for development to the desired bacteria. The medium should be slightly alkaline, or at least neutral, in reaction, and if needed, suitable material should be added to make it slightly alkaline, most desirably about 1% or 2%.

The medium may be inoculated with cultures of the desired bacteria obtained in any suitable way. For example, at the start I may use cultures prepared according to the processes set out in U. S. Patents of George H. Earp-Thomas Nos. 816,850 and 865,965, or I may use for inoculating fresh medium cultures produced according to my present invention. After inoculation the culture is kept at a suitable incubating temperature for the necessary time, usually from 3 to 5 days, for securing the desired growth and high count of bacteria. During such development the moisture content of the earthy culture medium should be maintained at approximately 15%, water being added from time to time as may be necessary to make up for loss by evaporation during incubation. Too little moisture retards the growth of the bacteria, and too much moisture lowers the resistance to contamination. The medium should also be kept suitably aerated, being for this purpose most desirably put in a thin layer in a shallow tray or "flat" or other suitable container and being stirred from time to time. Because of its being unfavorable to the growth of harmful organisms, the medium may be exposed directly to the atmosphere, although, of course, ordinary precautions are desirably taken against contamination. It is not necessary, however, that special or extreme precaution be taken as in developing cultures with the usual media not having the above property.

The cultures after incubation may be kept for long periods of time, retaining their high count of virile bacteria and comparative freedom from contamination.

Because of the very high count of virile bacteria in my cultures produced according to the present invention, a very small quantity of culture is sufficient for inoculating a relatively large amount of seed or a large area of land or large amount of fertilizing material. One to three ounces of the medium will carry sufficient bacteria for treating the seed for one acre of ground, the exact amount of culture required depending, of course, upon the extent to which the development of the culture has been carried. For distribution, the culture may be placed in simple boxes or containers of sheet tin or other suitable material provided with a small air opening or openings for supplying air to the culture and for maintaining an even atmospheric pressure within the container. A very small opening is sufficient, and in order to further conserve the moisture and also to reduce the entrance of contaminating organisms and prevent sifting out of the contents, the opening or openings are best protected by a pad or pads of non-absorbent cotton or other suitable air filtering material.

Cultures of beneficial soil bacteria in granular earthy material have been distributed heretofore packed in tin packages or containers having air openings and having a filter of cotton placed against the air opening inside the container and held in position by adhesive. Such an arrangement has been found defective for the reason that the bacteria attack and devour or disintegrate the cotton so that after a time the air openings are unprotected. Also by reason of the moisture of the culture the cotton is liable to become disconnected from the wall of the container and displaced. To overcome these difficulties, I have provided a container in which the cotton or other filtering material is held in compacted condition pressed between the wall of the container and a retaining plate which may be of the same material as the container and which is secured to the wall of the container. Such plate need not be perforated but may be an imperforate plate, the air then passing through the filter pad between the edge of the plate and the container wall. Such a container is shown in the accompanying drawings in which:

Figure 1:
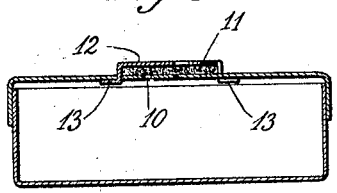
Fig. 1 is a sectional view of the container.
Figure 2:
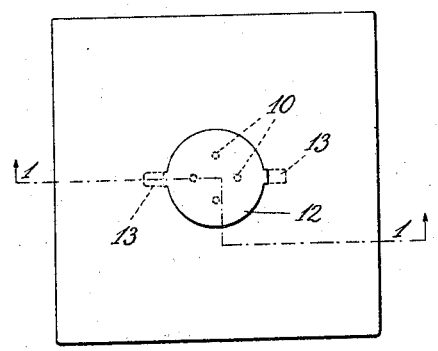
Fig. 2 is a top plan view.

In the container shown in the drawings, the top of the container is provided with air inlet openings 10 which are protected by a pad 11 of compacted non-absorbent cotton or other suitable fibrous material held against the top of the container in position to cover and protect the openings by means of a plate 12 which in the construction shown is secured to the container wall by means of end lugs or prongs 13 extending through the top of the container with their ends upset on the opposite side to hold the plate securely in place with the cotton pad pressed between the container wall and the plate. In the construction shown the filter pad and the holding plate are on the outside of the container, but they need not necessarily be so placed. Whether inside or outside, the plate 12 need not be perforated provided there is a sufficient open space between its edge and the container wall, and in either case the filter pad is protected against contact with the culture and access of the bacteria to such extent that the filter material, even if of a substance such as cotton which the bacteria will attack, will remain in condition for serving its function for a very long period of time.

In order that the culture may remain in the best condition, thorough aeration is highly desirable, not only for the growth of the bacteria but also to prevent the growth of molds. It is desirable, therefore, in order to maintain the culture in the highest state of virility to distribute them in small packages of amount sufficient for one or a few acres inoculation since a better aeration of the entire contents of the package is thus secured. I find that thorough aeration throughout the whole container filled with granular earthy medium is secured if no part of the medium is more than about 1 inch or a little over from an air opening; and when the air openings are in only one wall of the container, the container is most desirably made of flat form as shown in the drawings. The culture medium should most desirably have a moisture content of approximately 15% when put into the containers.

Among the kinds of bacteria to the production of cultures of which the present invention is applicable, may be mentioned the peptonizing bacteria, ammonifying bacteria, nitrifying bacteria, including nitrite bacteria and nitrate bacteria, nitrogen fixing bacteria, including both the symbiotic or legume nitrogen fixing bacteria and the non-symbiotic nitrogen fixing bacteria, or azotobacter, sulphur bacteria, decomposing bacteria, or ferments and other bacteria which I have not identified by species but whose presence in a mixed culture seems to have a desirable stimulating effect upon the growth of other bacteria in the culture. The particular bacteria to be used for inoculating the medium in any particular instance will depend upon the use to which the culture is to be put. Culture for use for inoculating the seed of a particular legume, for example, may be inoculated with merely a pure culture of the nitrogen fixing bacteria specific to the particular legume; or a culture to be used for inoculating seeds of various legumes may be inoculated with nitrogen fixing bacteria specific to legumes of the several different groups. I have found, however, that it is desirable for securing the best results to mix with the legume bacteria other kinds of bacteria, and more particularly the azotobacter and sulphur bacteria; and for cultures to be used otherwise than for inoculating legumes the medium may be inoculated with bacteria of several of the kinds above mentioned, and especially the nitrogen fixing bacteria, both symbiotic and non-symbiotic and sulphur bacteria.

As will be apparent, the materials to be mixed with the greensand marl or glauconite in other form, and the proportionate amounts thereof, may be varied within wide limits. I have secured excellent results, however, with a medium made according to the following formula:—

|  | Parts (by weight). |
|---|---|
| Fine ground greensand marl | 40 |
| Fine decomposed and neutralized 25% dry peat humus | 40 |
| Bone meal or fine ground phosphate rock | 16 |
| Mannite, malt and sugar in equal amounts | 2 |
| Hard wood ashes | 1 |
| Sulphur flour | 1 |
|  | 100 |

If the medium is too dry, water should be added, and suitable alkaline substances should be added if necessary to make the medium, most desirably, 1% or 2% alkaline.

To inoculate seed with the culture, all that is necessary is to mix the contents of the container with moistened seed and plant the seed. For inoculating soil, the culture is best mixed with some fine dry soil and then spread over the land to be inoculated. For inoculating fertilizing material, the granular earthy culture may be mixed directly with the amount of fertilizer to be inoculated, or better, the culture is first mixed with a small amount of the fertilizing material which is then mixed in with the balance of the material.

What is claimed is:

1. A medium for the culture of beneficial soil bacteria, comprising glauconite and carbonaceous material.

2. A medium for the culture of beneficial soil bacteria, comprising glauconite and carbonaceous material and phosphate bearing material.

3. A medium for the culture of beneficial soil bacteria, comprising glauconite as a principal constituent mixed with organic food and moisture retaining material.

4. A medium for the culture of beneficial soil bacteria, comprising glauconite as a principal constituent mixed with organic food and moisture retaining material, phosphate bearing material and sulphur material.

5. A medium for the culture of beneficial soil bacteria, comprising glauconite and humus material as its principal constituents and containing sulphur material.

6. A medium for the culture of beneficial soil bacteria, comprising glauconite and humus material as its principal constituents and containing also carbohydrate material, hard wood ashes and sulphur material in relatively small proportionate amounts.

7. A medium for the culture of beneficial soil bacteria, comprising greensand marl and additional organic nutrient material.

8. A medium for the culture of beneficial soil bacteria, comprising greensand marl and additional organic nutrient material, the medium being non-acid and having a moisture content of approximately 15%.

9. A medium for the culture of beneficial soil bacteria, consisting principally of greensand marl and humus material and having mixed therewith other material for increasing growth of the bacteria.

10. A non-acid medium for the culture of beneficial soil bacteria, comprising greensand marl and peat humus in approximately equal amounts, and relatively small amounts of other materials for feeding the bacteria and stimulating their growth.

11. As a new article of manufacture, a culture of beneficial soil bacteria grown in a medium of which a principal constituent is greensand marl.

12. As a new article of manufacture, a culture of beneficial soil bacteria grown in a medium comprising greensand marl and humus material as its principal constituents, and which is non-acid and contains approximately 15% of moisture.

13. As a new article of manufacture, a culture of beneficial soil bacteria grown in a medium comprising glauconite as a principal constituent mixed with organic nutrient and moisture-retaining material.

14. As a new article of manufacture, a culture of beneficial soil bacteria grown in a medium comprising glauconite and humus material as its principal constituents, and containing also carbohydrate material, hard wood ashes and sulphur material in relatively small proportionate amounts.

15. As a new article of manufacture, a culture of beneficial soil bacteria including legume nitrogen fixing bacteria grown in a medium comprising glauconite as a principal constituent mixed with organic nutrient and moisture-retaining material.

16. As a new article of manufacture, a culture of beneficial soil bacteria including legume nitrogen fixing bacteria, azotobacter nitrogen fixing bacteria and sulphur bacteria, grown in a medium comprising glauconite as a principal constituent mixed with organic nutrient and moisture-retaining material and sulphur material.

17. As a new article of manufacture, a culture of beneficial soil bacteria including legume nitrogen fixing bacteria, azotobacter nitrogen fixing bacteria, nitrifying bacteria, decomposing bacteria and sulphur bacteria, grown in a medium comprising glauconite as a principal constituent mixed with organic nutrient and moisture-retaining material and sulphur material.

18. As a new article of manufacture, a culture of beneficial soil bacteria including nitrogen fixing bacteria and sulphur bacteria grown in a medium comprising glauconite as a principal constituent mixed with organic nutrient and moisture-retaining material and sulphur material.

19. As a new article of manufacture, a culture of beneficial soil bacteria including nitrogen fixing bacteria and sulphur bacteria grown in a medium comprising greensand marl as a principal constituent mixed with organic nutrient and moisture-retaining material and sulphur material.

20. The process of producing a virile, copious culture of beneficial soil bacteria which comprises growing the bacteria in a medium of which a principal constituent is glauconite.

21. The process of producing a virile, copious culture of beneficial soil bacteria which comprises growing the bacteria in a granular earthy medium of which a principal constituent is glauconite.

22. The process of producing a virile, copious culture of beneficial soil bacteria which comprises growing the bacteria in a medium of which a principal constituent is greensand marl.

23. The process of producing a virile, copious culture of beneficial soil bacteria which comprises growing the bacteria in a granular earthy medium of which a principal constituent is greensand marl.

24. The process of producing a virile, copious culture of beneficial soil bacteria which comprises growing the bacteria in a granular earthy medium of which a principal constituent is greensand marl, the medium being spread out in a thin layer exposed to the atmosphere.

25. The process of producing virile copious cultures of beneficial soil bacteria which comprises growing the bacteria in a granular earthy medium of which a principal constituent is glauconite mixed with organic food and moisture-retaining material, the medium being exposed to the atmosphere and disturbed from time to time during incubation for aeration.

26. The process of preparing and distributing virile, copious cultures of beneficial soil bacteria which comprises growing the bacteria in a granular earthy medium of which a principal constituent is glauconite mixed with organic food and moisture-retaining material, the medium being spread out in a thin layer and exposed to the atmosphere, and distributing the culture thus produced in a container having an air opening and of such small size that air entering through said opening shall have ready access to all parts of the culture.

27. The process of preparing and distributing virile, copious cultures of beneficial soil bacteria which comprises growing the bacteria in a granular earthy medium of which a principal constituent is greensand marl mixed with organic food and moisture-retaining material, and distributing the culture thus produced in a container provided with means for supplying air to the culture, and maintaining the moisture content of the medium during growth and distribution at approximately 15%.

In testimony whereof I have hereunto set my hand in the presence of two subscribing witnesses.

HENRY W. EARP-THOMAS.

Witnesses:
JAMES ALLEN,
JAME P. BALLENGER.